(12) United States Patent
Inamoto et al.

(10) Patent No.: US 11,807,572 B2
(45) Date of Patent: Nov. 7, 2023

(54) GLASS PLATE, GLASS PLATE HAVING ANTI-REFLECTION LAYER, AND METHOD FOR PRODUCING GLASS PLATE

(71) Applicant: AGC INC., Tokyo (JP)

(72) Inventors: Misa Inamoto, Tokyo (JP); Satoru Tomeno, Tokyo (JP); Yuki Aoshima, Tokyo (JP)

(73) Assignee: AGC INC., Tokyo (JP)

( * ) Notice: Subject to any disclaimer, the term of this patent is extended or adjusted under 35 U.S.C. 154(b) by 102 days.

(21) Appl. No.: 17/138,118

(22) Filed: Dec. 30, 2020

(65) Prior Publication Data

US 2021/0114924 A1    Apr. 22, 2021

Related U.S. Application Data

(63) Continuation of application No. PCT/JP2019/026190, filed on Jul. 1, 2019.

(30) Foreign Application Priority Data

Jul. 4, 2018  (JP) .................................. 2018-127733
Sep. 21, 2018  (JP) .................................. 2018-177660

(51) Int. Cl.
*C03C 19/00*    (2006.01)
*C03C 17/34*    (2006.01)
(Continued)

(52) U.S. Cl.
CPC .......... *C03C 19/00* (2013.01); *C03C 17/3417* (2013.01); *C03C 2217/734* (2013.01);
(Continued)

(58) Field of Classification Search
CPC ......... G02F 1/133302; G02F 1/133305; G02F 1/133502; G02F 1/133331; G06F 1/1652;
(Continued)

(56) References Cited

U.S. PATENT DOCUMENTS

2012/0181346 A1 *  7/2012  Greer ................... C03C 17/006
                                                      264/293
2012/0218640 A1 *  8/2012  Gollier .................... C03C 15/00
                                                      359/601
(Continued)

FOREIGN PATENT DOCUMENTS

FR           2898991 A1 *  9/2007  ........... G02B 5/0221
JP        2014069999 A  *  4/2014  ............. C03C 15/00
(Continued)

OTHER PUBLICATIONS

Machine translation of JP 2018/052804 A, obtained from EspaceNet.*
(Continued)

*Primary Examiner* — Z. Jim Yang
(74) *Attorney, Agent, or Firm* — Foley & Lardner LLP

(57) ABSTRACT

The present invention relates to a glass sheet including a first main surface and a second main surface opposing the first main surface, in which the glass sheet has an affected layer directly below the first main surface, in at least a part of the first main surface, an average element length RSm is from 2500 nm to 6000 nm, a root-mean-square height Sq is from 3 nm to 45 nm, and a skewness Ssk is a negative value.

21 Claims, 1 Drawing Sheet

(51) Int. Cl.
  *G02F 1/1333*      (2006.01)
  *G06F 1/16*        (2006.01)
(52) U.S. Cl.
  CPC .. *C03C 2218/154* (2013.01); *G02F 1/133302* (2021.01); *G02F 1/133331* (2021.01); *G06F 1/1652* (2013.01); *Y10T 428/24355* (2015.01)
(58) Field of Classification Search
  CPC .... Y10T 428/24355; Y10T 428/24364; G02B 1/10–18; C03C 15/00; C03C 15/02; C03C 19/00
  See application file for complete search history.

(56) References Cited

U.S. PATENT DOCUMENTS

| | | | | |
|---|---|---|---|---|
| 2015/0174625 | A1* | 6/2015 | Hart | B08B 17/065 |
| | | | | 428/141 |
| 2015/0291467 | A1* | 10/2015 | Miura | C03C 21/00 |
| | | | | 65/30.13 |
| 2016/0130179 | A1* | 5/2016 | Kashima | G01B 5/28 |
| | | | | 428/141 |
| 2016/0236974 | A1* | 8/2016 | Sinapi | G02B 5/0221 |
| 2017/0113965 | A1* | 4/2017 | Siebers | C03C 17/04 |
| 2017/0276995 | A1* | 9/2017 | Sato | B24C 1/00 |
| 2017/0341451 | A1* | 11/2017 | Minamidate | B32B 17/10458 |
| 2018/0081111 | A1* | 3/2018 | Miyamoto | C03C 4/0092 |
| 2018/0095197 | A1* | 4/2018 | Dillon | B05D 5/06 |
| 2018/0179102 | A1* | 6/2018 | Shimizu | C04B 41/5022 |
| 2018/0215657 | A1* | 8/2018 | Jin | C03C 19/00 |
| 2018/0251398 | A1* | 9/2018 | Ikegami | C03C 17/25 |
| 2018/0257978 | A1* | 9/2018 | Minamidate | B32B 27/14 |
| 2018/0273421 | A1 | 9/2018 | Inamoto et al. | |
| 2018/0282207 | A1* | 10/2018 | Fujii | C03B 21/04 |
| 2019/0107751 | A1* | 4/2019 | Bazemore | C03C 3/085 |
| 2019/0317358 | A1* | 10/2019 | Yoon | H10K 50/84 |
| 2020/0180210 | A1* | 6/2020 | Kajioka | C03C 19/00 |
| 2020/0301521 | A1* | 9/2020 | Fujita | G06F 3/041 |
| 2020/0361812 | A1* | 11/2020 | Jin | C03C 15/00 |
| 2020/0407274 | A1* | 12/2020 | Agnello | C03C 15/00 |
| 2021/0214270 | A1* | 7/2021 | Shimizu | C03C 8/02 |
| 2022/0267195 | A1* | 8/2022 | Chen | C03C 21/002 |

FOREIGN PATENT DOCUMENTS

| | | | | |
|---|---|---|---|---|
| JP | 2014201445 A | * | 10/2014 | |
| JP | 2018-020942 A | | 2/2018 | |
| JP | 2018052804 A | * | 4/2018 | C03C 15/00 |
| WO | WO-2012073437 A1 | * | 6/2012 | G02B 1/105 |
| WO | WO-2016113970 A1 | * | 7/2016 | B24B 1/00 |
| WO | WO-2017082199 A1 | * | 5/2017 | B32B 38/145 |
| WO | WO-2017/094683 A1 | | 6/2017 | |
| WO | WO-2018123416 A1 | * | 7/2018 | B24B 9/00 |

OTHER PUBLICATIONS

NPL on surface roughness parameters from Tokyo Seimitsu (Year: 2004).*
Machine translation of JP-2014201445-A.*
Machine translation of JP-2014069999-A.*
Machine translation of FR-2898991-A1.*
International Searching Authority, "International Search Report," issued in connection with International Patent Application No. PCT/JP2019/026190, dated Aug. 27, 2019.
International Searching Authority, "Written Opinion," issued in connection with International Patent Application No. PCT/JP2019/026190, dated Aug. 27, 2019.

\* cited by examiner

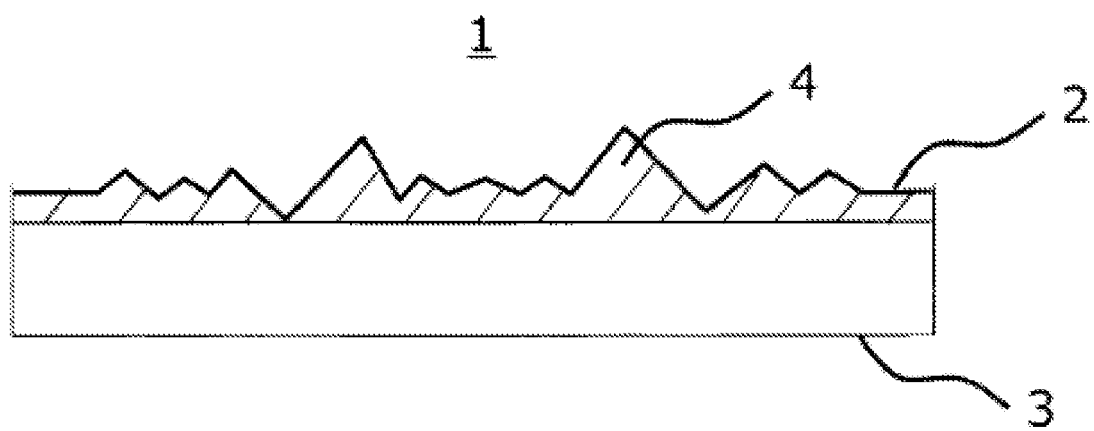

GLASS PLATE, GLASS PLATE HAVING ANTI-REFLECTION LAYER, AND METHOD FOR PRODUCING GLASS PLATE

CROSS-REFERENCE TO RELATED APPLICATIONS

This is a bypass continuation of International Patent Application No. PCT/JP2019/026190, filed on Jul. 1, 2019, which claims priority to Japanese Application Nos. 2018-127733, filed on Jul. 4, 2018, and 2018-177660, filed on Sep. 21, 2018. The contents of these applications are hereby incorporated by reference in their entireties.

TECHNICAL FIELD

The present invention relates to a glass sheet, an antireflection layer-attached glass sheet, and a production method of a glass sheet.

BACKGROUND ART

In a display input device that enables input of characters, FIGURES, etc. with a finger or a pen, a transparent cover member including a glass, etc. is disposed on the front surface side of the display device. As the cover member, a glass sheet satisfying both the writing feeling and the display resolution, and a glass sheet offering excellent touch feeling have been proposed (Patent Literature 1, and Patent Literature 2).

CITATION LIST

Patent Literature

Patent Literature 1: JP-A-2018-20942 (the term "JP-A" as used herein means an "unexamined published Japanese patent application")
Patent Literature 2: International Publication WO 2017/094683

SUMMARY OF INVENTION

Technical Problem

The present inventors found that in a glass sheet excellent in terms of the touch feeling, the writing feeling in pen input, and the display resolution, a problem of a warpage of the glass sheet occurs due to formation of a concave and convex structure.

An object of the present invention is to provide a glass sheet ensuring that the touch feeling, the writing feeling in pen input, and the display resolution are excellent and the warpage is suppressed.

Solution to Problem

As a result of intensive studies, the present inventors have found that when the concave and convex structure formed on the surface of the glass sheet satisfies specific conditions, the above-described problem can be solved, and the present invention has been accomplished based on this finding.

More specifically, it has been found that the above-described object can be attained by the following configurations.

A glass sheet including a first main surface and a second main surface opposing the first main surface, in which the glass sheet has an affected layer directly below the first main surface, and in at least a part of the first main surface, an average element length RSm is from 2,500 nm to 6,000 nm, a root-mean-square height Sq is from 3 nm to 45 nm, and a skewness Ssk is a negative value, is provided.

ADVANTAGEOUS EFFECTS OF INVENTION

The glass sheet of the present invention ensures that the touch feeling, the writing feeling in pen input, and the display resolution are excellent and the warpage is suppressed.

BRIEF DESCRIPTION OF DRAWINGS

FIGURE is a cross-sectional diagram illustrating one example of the glass sheet 1 of the present invention.

DESCRIPTION OF EMBODIMENTS

The glass sheet of the present invention and a production method thereof are described.

The configuration requirements described below are explained based on representative embodiments of the present invention in some cases, but the present invention is not limited to these embodiments.

The "to" indicating a numerical range means to include numerical values described before and after it as a lower limit value and an upper limit value.

(Glass Sheet)

The FIGURE is a cross-sectional diagram illustrating one example of the glass sheet 1 of the present invention. The glass sheet 1 includes a first main surface 2 and a second main surface 3 opposing the first main surface 2. An affected layer 4 is present directly below the first main surface 2. More specifically, the glass sheet 1 has the affected layer 4 on the outermost surface on the first main surface 2 side.

For the sake of convenience of description, the dimensional ratio in the FIGURE differs from the actual dimensional ratio.

Examples of the glass sheet 1 include soda lime glass, aluminosilicate glass, borosilicate glass, and aluminoborosilicate glass. Among these, the glass sheet 1 is preferably soda lime glass or aluminosilicate glass.

The thickness of the glass sheet 1 is preferably from 0.1 mm to 20 mm. In the tablet or smartphone cover glass applications, the thickness of the glass sheet 1 is more preferably 0.3 mm or more, particularly preferably 0.4 mm or more. The thickness of the glass sheet 1 is more preferably 0.7 mm or less, and particularly preferably 0.6 mm or less. Also, in the digital signage applications, the thickness of the glass sheet 1 is more preferably 3 mm or more, and particularly preferably 5 mm or more. The thickness of the glass sheet 1 is more preferably 15 mm or less, and particularly preferably 10 mm or less.

The first main surface 2 of the glass sheet 1 is preferably chemically strengthened. In this case, a compressive stress value of the first main surface 2 which has been chemically strengthened is preferably from 200 MPa to 1,000 MPa. In addition, the depth of a compressive stress layer of the first main surface 2 which has been chemically strengthened is preferably from 5 μm to 150 μm. Furthermore, the second main surface 3 is preferably chemically strengthened as well.

In the glass sheet 1, a relative difference (absolute value of the difference) between an Al/Si value in the first main surface 2 and an Al/Si value in the second main surface 3 is preferably 0.1 or less. When the relative difference of the Al/Si value is 0.1 or less, in a glass sheet 1 where a concave and convex structure is formed on the first main surface 2, the relative difference between a residual stress generated in the first main surface 2 and the residual stress generated in the second main surface 3 can be reduced, as a result, the warpage of the glass sheet 1 is suppressed. Furthermore, in the case where the first main surface 2 and second main surface 3 of the glass sheet 1 are chemically strengthened, the relative difference between the compressive stress value of the first main surface 2 and the compressive stress value of the second main surface 3 becomes 20 MPa or less, and a warpage of the glass sheet 1 which has been chemically strengthened is also suppressed. The relative difference between the Al/Si value in the first main surface 2 and the Al/Si value in the second main surface 3 is more preferably 0.05 or less, and particularly preferably 0.03 or less.

The Al/Si value is a value calculated as follows.

The first main surface 2 and second main surface 3 of the glass sheet 1 were measured for a binding energy of Al2p and the binding energy of Si2p by an X-ray photoelectron spectrometer (PHI 1500 VersaProbe, manufactured by ULVAC-PHI, Inc.). The measurement range of Al2p was from 70 eV to 80 eV, the energy step was 0.1, and the cumulated number was 200 times. The measurement range of Si2p was from 96 eV to 111 eV, the energy step was 0.1, and the cumulated number was 50 times. The Al/Si value was a value obtained by dividing the peak area of the Al2p binding energy peak after background correction by the peak area of the Si2p binding energy peak after background correction. Incidentally, each energy peak was standardized assuming that the C1s peak of carbon generated by air exposure is 284.5 eV.

In the glass sheet 1, an absolute value of the warpage before chemical strengthening is preferably 200 μm or less. When the absolute value of the warpage before chemical strengthening is 200 μm or less, the absolute value of the warpage after chemical strengthening can be controlled to be 300 μm or less. Here, in the present invention, the absolute value of the warpage of the glass sheet 1 is a value at the time of measuring a glass sheet in which the thickness is 0.5 mm and each of four sides has a length of 100 mm. The absolute value of the warpage of the glass sheet 1 was measured using a flatness tester (FT-17, manufactured by Nidek Co., Ltd.). Incidentally, the absolute value of the warpage of the glass sheet 1 having a thickness of 0.5 mm can also be calculated using a glass sheet 1 having a different thickness. Because, it is generally known that the absolute value of the warpage of a glass sheet is inversely proportional to the square of the thickness of the glass sheet. Accordingly, for example, in the case where the absolute value of the warpage of a glass sheet having a thickness of 0.7 mm, with four sides being 100 mm in length, is 100 μm, the absolute value of the warpage of a glass sheet having a thickness of 0.5 mm, with four sides being 100 mm in length, can be calculated as 196 μm based on the knowledge above.

(First Main Surface of Glass Sheet)

In at least a part of the first main surface 2 of the glass sheet 1, the average element length RSm is from 2,500 nm to 6,000 nm, the root-mean-square height Sq is from 3 nm to 45 nm, and the skewness Ssk is a negative value.

The "average element length RSm" is an average pitch of irregularities in a roughness curve specified in JIS B0601: 2001. When the RSm in the first main surface 2 of the glass sheet 1 is 2,500 nm or more, at the time of pen input, a feel of being appropriately caught without excessive sliding is perceived, and this facilitates writing. Furthermore, when the RSm is 2,500 nm or more, the residual stress generated in the first main surface 2 of the glass sheet 1 can be reduced, and the warpage of the glass sheet 1 can be suppressed. When the RSm in the first main surface 2 of the glass sheet 1 is 6,000 nm or less, at the time of pen input, a rough and uneven feeling is eliminated, and smooth writing is available. Furthermore, when the RSm is 6,000 nm or less, the residual stress generated in the first main surface 2 of the glass sheet 1 can be reduced, and the warpage of the glass sheet 1 can be suppressed. The RSm is preferably 2,600 nm or more, and particularly preferably 2,800 nm or more. The RSm is preferably 5,500 nm or less, and particularly preferably 5,000 nm or less.

The "root-mean-square height Sq" is a standard deviation of the distance from an average surface specified in ISO25178. When the Sq in the first main surface 2 of the glass sheet 1 is 3 nm or more, smooth tactile sensation is offered at the time of touching with a finger, and a good touch feeling is obtained. When the Sq in the first main surface 2 of the glass sheet 1 is 45 nm or less, a rough feeling can be reduced, and the display resolution and the transparency when the display is turned off can be kept high. The Sq is preferably 5 nm or more, and particularly preferably 7 nm or more. The Sq is preferably 40 nm or less, and particularly preferably 16 nm or less.

The "skewness Ssk" indicates a symmetry of height distribution specified in ISO25178. When the Ssk in the first main surface 2 of the glass sheet 1 is a negative value, the surface has a large number of valleys, and the structure is hard to collapse even when repeatedly rubbed with a hard tip material such as pen, as a result, a good writing feeling continues. The Ssk is preferably −0.2 or less, more preferably −0.3 or less, and particularly preferably −0.5 or less. The Ssk is preferably −3.0 or more, more preferably −2.5 or more, and particularly preferably −2.0 or more.

When in the first main surface 2 of the glass sheet 1, the Sq is from 3 nm to 45 nm and the Ssk is a negative value, this indicates that the first main surface 2 has many valleys and the valleys have a relatively uniform depth. The first main surface 2 of the glass sheet 1 having such a surface profile is excellent in terms of the touch feeling, the writing feeling in pen input, and the display resolution. Furthermore, when the RSm in the first main surface 2 of the glass sheet 1 is controlled to be from 2,500 nm to 6,000 nm, the residual stress generated in the first main surface 2 can be reduced, and the warpage of the glass sheet 1 is suppressed.

The glass sheet 1 has, directly below the first main surface 2, an affected layer 4 attributable to the formation of the concave and convex structure. The "affected layer" is a region possessing a larger amount of water than an amount of water possessed by other parts of the glass sheet 1. The glass sheet 1 has the affected layer 4 possessing a large amount of water, and the warpage is thereby suppressed. The warpage of the glass sheet 1 is attributable to a residual stress generated in the affected layer 4. The mechanism in which the affected layer 4 suppresses the warpage is unknown, but the present inventors believe that since the affected layer 4 possessing the large amount of water is in the state of being increased in mobility as a network due to breakage of part of the network constituting the glass, the residual stress generated in the affected layer 4 is relieved and the warpage of the glass sheet 1 is suppressed.

It is preferred that a relationship between an average hydrogen concentration Hs of the affected layer 4 and an average hydrogen concentration Hb of the inside region present in the lower part from the affected layer 4 satisfies 1<Hs/Hb<50. When the Hs/Hb is more than 1 and less than 50, the amount of water possessed by the affected layer 4 increases. When the amount of water possessed by the affected layer 4 is increased, bonds constituting glass become easy to move, and the residual stress generated in the affected layer 4 is relieved, as a result, the warpage of the glass sheet 1 can be suppressed. The inside region indicates a region from a depth of 500 nm to a depth of 1,000 nm from the first main surface side of the glass sheet. Incidentally, the average hydrogen concentration Hs and the average hydrogen concentration Hb are calculated as follows.

(Hs/Hb Calculation Method)

Depth-direction profiles of $^1H^-$ and $^{30}Si^-$ intensities of the glass sheet 1 are acquired using Secondary Ion Mass Spectrometry (SIMS). Thereafter, the $^1H^-$ profile is divided by the $^{30}Si^-$ profile to obtain a depth-direction profile of a $^1H^-/^{30}Si^-$ intensity ratio. From the obtained depth-direction profile of the $^1H^-/^{30}Si^-$ intensity ratio, an average $^1H^-/^{30}Si^-$ intensity ratio in the region of the affected layer 4 is taken as an average hydrogen concentration Hs of the affected layer 4. Similarly, from the obtained depth-direction profile of the $^1H^-/^{30}Si^-$ intensity ratio, an average $^1H^{31}/^{30}Si^-$ intensity ratio in the region from a depth of 500 nm to a depth of 1,000 nm is taken as an average hydrogen concentration Hb of the inside region. The obtained average hydrogen concentration Hs of the affected layer 4 is divided by the average hydrogen concentration Hb of the inside region to obtain an Hs/Hb. The Hs/Hb is more preferably 1.50 or more, further more preferably 5.00 or more, particularly preferably 9.00 or more, and most preferably 10.0 or more. The Hs/Hb is more preferably less than 45, further more preferably less than 40, and particularly preferably less than 35.

Here, in the case where the amount of water in the affected layer is too large, a soluble component (for example, a metal ion such as $Na^+$) in the glass sheet sometimes reacts with water in the affected layer to disadvantageously cause a surface of the glass sheet to cloud. On the other hand, in order to relieve the warpage of the glass sheet, an appropriate amount of water is preferably present in the affected layer. Specifically, if the Hs/Hb is 50 or more, cloudy weathering, etc. may occur in the glass sheet and work out to a defect. Therefore, the Hs/Hb is preferably less than 50.

Incidentally, the measurement conditions of SIMS are as follows.

Apparatus: ADEPT1010, manufactured by ULVAC-PHI, Inc.
Primary ion species: $Cs^+$
Primary ion accelerating voltage: 5 kV
Primary ion current value: 500 nA
Primary ion incident angle: 60° with respect to normal line of sample face
Primary ion raster size: 300×300 $\mu m^2$
Secondary ion polarity: minus
Secondary ion detection region: 60×60 $\mu m^2$ (4% of raster size of primary ion)
Use of neutralization gun: used A thickness of the affected layer 4 is preferably from 30 nm to 500 nm. When the thickness of the affected layer 4 is 30 nm or more, a concave and convex structure having the RSm of from 2,500 nm to 6,000 nm, the Sq of from 3 nm to 45 nm, and the Ssk of a negative value, can be easily produced. When the thickness of the affected layer 4 is 500 nm or less, the residual stress generated in the affected layer 4 can be reduced, and the warpage of the glass sheet 1 can be suppressed. Incidentally, in the present invention, the thickness of the affected layer 4 is a maximum height Sz calculated with SPIP (Scanning Image Processor) from an AFM image of the surface of the glass sheet 1 measured using a scanning probe microscope. The thickness of the affected layer 4 is more preferably 40 nm or more, and particularly preferably 50 nm or more. The thickness of the affected layer 4 is more preferably 400 nm or less, particularly preferably 300 nm or less, and most preferably 150 nm or less.

A density of the affected layer 4 is preferably from 2.39 $g/cm^3$ to 2.51 $g/cm^3$. When the density of the affected layer 4 is from 2.39 $g/cm^3$ to 2.51 $g/cm^3$, the residual stress generated in the affected layer 4 can be reduced, so that the warpage of the glass sheet 1 can be suppressed.

The "arithmetic mean height Sa/average element length RSm" indicates gentleness of a roughness curve. In the first main surface 2 of the glass sheet 1, the Sa (nm)/RSm (nm) is preferably from 0.001 to 0.01. When the Sa/RSm is 0.001 or more, the concave and convex structure having the RSm of from 2,500 nm to 6,000 nm, the Sq of from 3 nm to 45 nm, and the Ssk of a negative value, can be easily produced. When the Sa/RSm is 0.01 or less, the roughness curve can be made gentle, and the residual stress generated in the affected layer 4 can be reduced, so that the warpage of the glass sheet 1 can be suppressed. The Sa/RSm is more preferably 0.006 or less, and particularly preferably 0.003 or less.

The "maximum peak height Sp" is a maximum value of the height from an average surface specified in ISO25178. In the first main surface 2 of the glass sheet 1, the Sp is preferably from 20 nm to 250 nm. When the Sp is 20 nm or more, the concave and convex structure having the RSm of from 2,500 nm to 6,000 nm, the Sq of from 3 nm to 45 nm, and the Ssk of a negative value, can be easily produced. When the Sp is 250 nm or less, the residual stress generated in the affected layer 4 can be reduced, and the warpage of the glass sheet 1 can be suppressed. The Sp is more preferably 25 nm or more, and particularly preferably 30 nm or more. Sp is more preferably 150 nm or less, and particularly preferably 60 nm or less.

In the glass sheet 1, the haze measured by making light incident from the first main surface 2 side is preferably 2.0% or less. When the haze of the glass sheet 1 is 2.0% or less, the haze of an antireflection layer-attached glass sheet 1 including an antireflection layer on the first main surface 2 of the glass sheet 1 can be reduced to 2.0% or less. The haze of the glass sheet 1 is more preferably 1.0% or less, and particularly preferably 0.8% or less. The lower limit value of the haze of the glass sheet 1 is 0.0%.

The antireflection layer can be configured by alternately stacking a layer including a high-refractive-index material and a layer including a low-refractive-index material. In addition, the antireflection layer may have a graded structure in which the refractive index changes continuously in the film thickness direction. Here, it is preferred that the refractive index of the layer including a high-refractive-index material is from 1.70 to 2.70 and the refractive index of the layer including a low-refractive-index material is from 1.30 to 1.55. The method for forming such an antireflection layer is not particularly limited. For example, the film may be deposited by a vapor deposition method such as electron beam vapor deposition and resistance heating, a CVD method, a plasma CVD method, a sputtering method, or a coating method, etc.

(Second Main Surface of Glass Sheet)

The second main surface 3 of the glass sheet 1 preferably has the Sa of 0.0 nm to 0.2 nm and the RSm of 10,000 nm to 15,000 nm. When the Sa and RSm of the second main surface 3 are in the ranges above, a laminating property to a display is excellent, and the haze of the glass sheet 1 can be reduced to 2.0% or less.

In the case where the glass sheet 1 has a concave and convex structure in the second main surface 3, as with the first main surface 2, it is preferred that the RSm is from 2,500 nm to 6,000 nm, the Sq is from 3 nm to 45 nm, and the Ssk is a negative value. When the second main surface 3 of the glass sheet 1 has such a surface profile, the residual stress generated in the second main surface 3 can be reduced, and the difference between the residual stresses generated in the first main surface 2 and the second main surface 3 is decreased, as a result, the warpage of the glass sheet 1 is suppressed.

(Production Method of Glass Sheet)

The production method of the glass sheet 1 includes forming the concave and convex structure, and examples of the treatment in this step include a wet etching treatment, a grinding treatment, a polishing treatment, a thermal roughening treatment, a sandblasting treatment, a plasma etching treatment, and a wet blasting treatment, to the surface of the glass sheet. Especially, the wet etching treatment or the wet blasting treatment is preferred.

The wet etching treatment is performed using a hydrofluoric acid, a sulfuric acid, and an ammonium fluoride.

The wet blasting treatment is a treatment of uniformly stirring abrasive grains and a liquid to make a slurry and spraying the slurry on the surface of the glass sheet from a spraying nozzle by using compressed air. It is preferable to form the affected layer 4 directly below the first main surface 2 of the glass sheet by the wet blasting treatment. In the wet blasting treatment of spraying a slurry containing abrasive grains on the surface of the glass sheet, a spraying angle relative to the surface of the glass sheet is preferably from 25° to 80°. The spraying angle is an angle made by the flow of a slurry ejected from the nozzle and the surface of the glass sheet. When the spraying angle relative to the surface of the glass sheet is 25° or more, while keeping the thickness of the affected layer 4 in certain range, a concave and convex structure excellent in terms of the touch feeling, the writing feeling in pen input, and the display resolution can be formed. When the spraying angle is 80° or less, the thickness of the affected layer 4 can be reduced to 500 nm or less, and the warpage of the glass sheet 1 is suppressed. The spraying angle is more preferably 30° or more, and particularly preferably 40° or more. The spraying angle is more preferably 70° or less, and particularly preferably 60° or less.

The average grain size of the abrasive grains is preferably 4 μm or less, more preferably 3 μm or less, and particularly preferably 2 μm or less. When the average grain size is 4 μm or less, all of the warpage, the touch feeling and the display resolution can be satisfied. Incidentally, the average grain size of the abrasive grains is determined by measuring the maximum length of the abrasive grain in an arbitrary surface of 10,000 μm$^2$ at least at 20 points by a scanning microscope and an image analyzing device and averaging the measured maximum lengths.

In the foregoing pages, the constituent elements of the glass sheet 1 according to one embodiment of the present invention are described. However, these are a mere example, and it is apparent to one skilled in the art that the glass sheet 1 of the present invention may have other configurations, for example, may have an antireflection layer or a fingerprint removal layer.

EXAMPLES

The present invention is described in detail below by referring to Examples, but the present invention is not limited thereto. Ex. 1 to Ex. 9 are Working Examples and Ex. 10 to Ex. 14 are Comparative Examples.

Ex. 1

Two sheets of aluminosilicate glass (100 mm×100 mm×thickness 0.5 mm) were prepared as the glass sheet. The composition of the aluminosilicate glass was $SiO_2$: 64.3 mol %, $Al_2O_3$: 10.5 mol %, $Na_2O$: 16.0 mol %, $K_2O$: 0.8 mol %, MgO: 8.3 mol %, and $ZrO_2$: 0.2 mol %.

A slurry including white alumina abrasive grains (#6000, average grain size: 2 μm) and water was sprayed on one main surface of the glass sheet to form the concave and convex structure. The spraying angle relative to the surface of the glass sheet was 45°, the distance between the glass sheet and the injection port was 30 mm, the treatment speed was 20 mm/sec, the spraying pressure was 0.1 MPa, and the number of treatments was 10 times.

After spraying the slurry, the surface of the glass sheet was washed with water to obtain a glass sheet 1.

Meanwhile, on a first main surface 2 of the glass sheet 1 obtained in Ex. 1, an antireflection layer (AR film) was deposited by a sputtering method to also obtain an AR film-attached glass sheet. The antireflection layer was configured to have a four-layer structure of niobium oxide layer (thickness: 14 nm)/silicon oxide layer (thickness: 31 nm)/niobium oxide layer (thickness: 113 nm)/silicon oxide layer (thickness: 87 nm).

Ex. 2 to Ex. 9, Ex. 12 to Ex. 14

Glass sheets 1 were obtained in the same manner as in Ex. 1 except for changing the configuration to those shown in Table 1. Also, in the white alumina abrasive grains, the average grain size of #4000 was 3 μm, and the average grain size of #3000 was 4 μm.

Incidentally, in Ex. 9, a glass sheet 1 and an AR film-attached glass sheet were obtained in the same manner as in Ex. 1 except for changing the composition of the aluminosilicate glass prepared to $SiO_2$: 67.1 mol %, $Al_2O_3$: 13.1 mol %, $B_2O_3$: 3.6 mol %, $Na_2O$: 13.7 mol %, $K_2O$: 0.1 mol %, and MgO: 2.4 mol % and changing the configuration to that shown in Table 1.

Furthermore, in Ex. 2, Ex. 6, Ex. 9 and Ex. 11, the Hs/Hb in the first main surface of the glass sheet 1 was calculated after acquiring necessary data by the "Hs/Hb Measurement Method" above.

Ex. 10

In Ex. 10, a glass sheet 1 and an AR film-attached glass sheet were obtained in the same manner as in Ex. 1 except for not forming the concave and convex structure.

Ex. 11

In Ex. 11, a glass sheet was obtained in the same manner as in Ex. 1 except for changing the wet blasting treatment to a sandblasting treatment. The sandblasting treatment was performed using white alumina abrasive grains (#3000, average grain size: 4 μm) at a projection pressure of 0.2 MPa.

TABLE 1

| | | | Formation of Concave and Convex Shape | | | | |
|---|---|---|---|---|---|---|---|
| Ex. | | Alumina Abrasive Grains | Spraying Angle [degree] | Distance Between Glass Sheet and Injection Port [mm] | Spraying Pressure [MPa] | Treatment Speed [mm/sec] | Number of Treatments |
| 1 | wet | #6000 | 45 | 30 | 0.10 | 20 | 10 |
| 2 | blasting | #4000 | | 70 | | | |
| 3 | treatment | | 30 | 100 | 0.14 | | |
| 4 | | | 45 | 70 | 0.20 | | 2 |
| 5 | | | 90 | | | | |
| 6 | | | | | | | 10 |
| 7 | | #3000 | 45 | | | | |
| 8 | | | | 30 | | | 2 |
| 9 | | | 90 | | | | |
| 10 | | | | none | | | |
| 11 | | | | sandblasting treatment | | | |
| 12 | wet | #4000 | 90 | 100 | 0.20 | 20 | 2 |
| 13 | blasting | | | 30 | | | |
| 14 | treatment | #3000 | | 30 | 0.10 | | |

| | First Main Surface | | | | | | Affected | | Second Main Surface | | | |
|---|---|---|---|---|---|---|---|---|---|---|---|---|
| Ex. | Sa [nm] | RSm [nm] | Sa/RSm | Sq [nm] | Ssk | Sp [nm] | Layer [nm] | Hs/Hb | Sa [nm] | RSm [nm] | Sa/RSm | Sp [nm] |
| 1 | 7.0 | 3430 | 0.002 | 9.4 | −1.1 | 40.5 | 125 | — | 0.1 | 13640 | 0.000 | 0.2 |
| 2 | 3.4 | 4930 | 0.001 | 5.1 | −2.2 | 40.5 | 108 | 25.5 | | | | |
| 3 | 7.0 | 2820 | 0.002 | 9.5 | −1.0 | 54.7 | 129 | — | | | | |
| 4 | 7.6 | 2515 | 0.003 | 10.2 | −0.9 | 48.5 | 141 | — | | | | |
| 5 | 11.0 | 3120 | 0.004 | 14.6 | −0.6 | 85.7 | 182 | — | | | | |
| 6 | 13.4 | 2875 | 0.005 | 17.7 | −0.7 | 94.3 | 206 | 15.6 | | | | |
| 7 | 22.9 | 4370 | 0.005 | 30.5 | −0.5 | 144.7 | 367 | — | | | | |
| 8 | 27.5 | 4780 | 0.006 | 36.3 | −0.7 | 126.0 | 351 | — | | | | |
| 9 | 30.4 | 4790 | 0.006 | 39.9 | −0.3 | 183.1 | 389 | 10.2 | | | | |
| 10 | 0.1 | 13640 | 0.000 | 0.2 | 3.0 | 9.7 | — | — | | | | |
| 11 | 38.3 | 3720 | 0.010 | 54.8 | −1.3 | 268.5 | 593 | 8.2 | | | | |
| 12 | 20.0 | 1510 | 0.013 | 27.1 | −0.5 | 147.8 | 210 | — | | | | |
| 13 | 33.0 | 2340 | 0.014 | 41.0 | −0.8 | 163.5 | 300 | — | | | | |
| 14 | 12.0 | 6500 | 0.002 | 20.0 | −1.3 | 153.0 | — | — | | | | |

The obtained glass sheets were evaluated for the RSm, the Sa, the Sq, the Ssk, the Sp, the Sz, the Al/Si, the haze, the absolute value of the warpage, the touch feeling, the writing feeling in pen input, and the display resolution. The results are shown in Table 2.

(RSm)

The first main surface 2 of the glass sheet 1, on which the concave and convex structure was formed, was measured using a laser microscope (VK-X250, manufactured by Terence Corporation to obtain the RSm. The number of acquired data was 1,024×768 pixels, the measurement area was 32 μm×24 μm, and the line roughness in the measurement area was measured at 30 places or more.

(Sa, Sq, Ssk, Sp, Sz)

The first main surface 2 of the glass sheet 1, on which the concave and convex structure was formed, was measured using a scanning probe microscope (SPI3800N, manufactured by SII NanoTechnology Inc.) to acquire an AFM image. The acquired AFM image was subjected to an image analysis by SPIP (Scanning Image Processor) to obtain the Sa, the Sq, the Ssk, the Sp, and the Sz. Incidentally, an average value of the values determined from AFM images obtained at 3 places was taken as each of the Sa, the Sq, the Ssk, the Sp, and the Sz. The scanning area was a square region with one side of 8 μm, the number of acquired data was 512×512, and the scanning frequency was set to 0.4 kHz. However, in Ex. 11, the scanning area was changed to a square region with one side of 24 μm.

(Al/Si)

The first main surface 2 and second main surface 3 of the glass sheet 1 were measured for the binding energy of Al2p and the binding energy of Si2p by an X-ray photoelectron spectrometer (PHI 1500 VersaProbe, manufactured by ULVAC-PHI, Inc.). The measurement range of Al2p was from 70 eV to 80 eV, the energy step was 0.1, and the cumulated number was 200 times. The measurement range of Si2p was from 96 eV to 111 eV, the energy step was 0.1, and the cumulated number was 50 times. The Al/Si value was a value obtained by dividing the peak area of the Al2p binding energy peak after background correction by the peak area of the Si2p binding energy peak after background correction. Incidentally, each energy peak was standardized assuming that the C1s peak of carbon generated by air exposure is 284.5 eV. In addition, for the background correction, the Background Subtract (Truncate) function of a software (MultiPak) attached to the X-ray photoelectron spectrometer was used.

As the relative difference between the Al/Si value in the first main surface 2 and the Al/Si value in the second main surface, an absolute value of a value obtained by subtracting the Al/Si value in the second main surface from the Al/Si value in the first main surface was used.

(Haze)

Using a haze meter (HZ-2, manufactured by Suga Test Instruments Co., Ltd.), light was made incident from the first main surface 2 side of the glass sheet 1, where the concave and convex structure was formed, and the haze was measured under the conditions in conformity with JIS K7361. Incidentally, an average value of the values obtained at 3 places was taken as the haze of the glass sheet 1 according to the present invention.

(Haze AR)

Using a haze meter (HZ-2, manufactured by Suga Test Instruments Co., Ltd.), light was made incident from the first main surface 2 side of the glass sheet 1 where an AR film was formed on the first main surface, and the haze was measured under the conditions in conformity with JIS K7361. Incidentally, an average value of the values obtained at 3 places was taken as the haze of the AR film-attached glass sheet.

(Absolute Value of Warpage)

Using a flatness tester (FT-17, manufactured by Nidek Co., Ltd.), the warpage of the glass sheet 1 was measured to obtain an absolute value of the warpage. The thickness of the glass sheet 1 was 0.5 mm, and the length of each of four sides was 100 mm.

Incidentally, the warpage was measured after chemically strengthening the glass sheets 1 obtained in Ex. 1 and Ex. 4 and found to be 10.1 μm and 2.2 μm, respectively. The chemical strengthening treatment was performed under the conditions of immersing the glass sheet 1 in a potassium nitrate-containing molten salt at 450° C. for 2 hours.

(Touch Feeling)

The dynamic friction coefficient in the first main surface 2 of the glass sheet 1, where the concave and convex structure was formed, was measured using a tactile gauge (Type 33, manufactured by Shinto Scientific Co., Ltd.). The dynamic friction coefficient was calculated by measuring the force applied in the vertical direction and the force applied in the traveling direction when a nitrile-gloved finger was moved in the state of being in contact with the first main surface 2 of the glass sheet 1. Incidentally, an average value of the values obtained at 3 places was taken as the dynamic friction coefficient. A: The dynamic friction coefficient is 2.0 or less; B: the dynamic friction coefficient is 2.0 or more and less than 2.5; and C: the dynamic friction coefficient is 2.5 or more.

(Writing Feeling in Pen Input)

The writing feeling when inputting characters and FIGURES, etc. with a pen on the first main surface 2 of the glass sheet 1, where the concave and convex structure was formed, was evaluated by a sensory test. Pro Pen (KP-503E) manufactured by Wacom Co., Ltd. was used as the pen, and the writing feeling was judged by rating A when the writing feeling on the first main surface 2 of the glass sheet 1 was substantially the same in terms of sensation as the writing feeling on paper with an HB mechanical pencil, rating B when it was close to the writing feeling with the mechanical pencil, and rating C when it was different in terms of sensation from the writing feeling with the mechanical pencil, for example, the pen was likely to slide or difficult to slide.

(Display Resolution)

The glass sheet 1 was disposed on the front side of a display device, and the resolution of an image displayed on this display device was evaluated. A: A clear image was seen, and no blur was observed in the image. B: The image could be sufficiently visible but image blur was slightly observed. C: The image was unclear and the image blur was conspicuous.

TABLE 2

| | Glass Plate | | | | | | |
|---|---|---|---|---|---|---|---|
| Ex. | Absolute Value of Difference of Al/Si | Haze [%] | Haze AR [%] | Warpage (absolute value) [μm] | Touch Feeling | Writing Feeling | Resolution |
| 1 | 0.05 | 0.25 | 0.5 | 7.1 | A | 1.50 | B | A |
| 2 | 0.00 | 0.07 | 0.2 | 8.6 | B | 2.43 | B | A |
| 3 | 0.00 | 0.23 | 0.5 | 15.2 | A | 1.85 | B | A |
| 4 | 0.10 | 0.39 | 0.8 | 8.1 | A | 1.83 | B | A |
| 5 | 0.00 | 0.69 | 1.8 | 87.5 | A | 1.47 | B | A |
| 6 | 0.00 | 1.15 | 2.5 | 102.3 | A | 1.42 | B | A |
| 7 | 0.03 | 4.68 | 7.2 | 98.5 | A | 1.24 | A | B |
| 8 | 0.10 | 6.25 | 9.9 | 107.2 | A | 1.16 | A | B |
| 9 | 0.00 | 9.17 | 14.9 | 157.7 | A | 1.07 | A | B |
| 10 | 0.10 | 0.01 | 0.0 | 1.5 | C | 2.64 | C | A |
| 11 | 0.00 | 11.25 | 15.8 | 240.2 | A | 1.09 | B | C |
| 12 | 0.01 | 4.21 | 7.0 | 312.5 | A | 1.51 | C | B |
| 13 | 0.00 | 3.90 | 5.1 | 248.7 | A | 1.42 | C | B |
| 14 | 0.02 | 0.80 | 1.4 | 350.1 | A | 1.73 | C | B |

In glass sheets 1 obtained in Ex. 1 to Ex. 9, the touch feeling, the writing feeling in pen input, and the display resolution were excellent, and the warpage was suppressed. In the glass sheet obtained in Ex. 10, the warpage and the display resolution were excellent, but the touch feeling and the writing feeling in pen input were poor. In the glass sheet obtained in Ex. 11, the touch feeling and the writing feeling in pen input were excellent, but the warpage and the display resolution were poor. In the glass sheets obtained in Ex. 12 to Ex. 14, the touch feeling and the display resolution were excellent, but the writing feeling in pen input and the warpage were poor. Incidentally, even when an AR film is attached, the tactile sensation, the resolution etc. are not greatly changed, compared to those of a glass sheet having no AR film.

While the invention has been described in detail and with reference to specific embodiments thereof, it will be apparent to one skilled in the art that various changes and modifications can be made therein without departing from the spirit and scope of the invention.

INDUSTRIAL APPLICABILITY

The glass sheet 1 of the present invention is useful as a cover member for display input devices.

REFERENCE SIGNS LIST

1: Glass sheet
2: First main surface
3: Second main surface
4: Affected layer

The invention claimed is:

1. A glass sheet comprising a first main surface and a second main surface opposing the first main surface, wherein
the glass sheet has an affected layer directly below the first main surface,
in at least a part of the first main surface, an average element length RSm is from 2,500 nm to 6,000 nm, a root-mean-square height Sq is from 3 nm to 45 nm, and a skewness Ssk is a negative value,
an absolute value of a warpage of the glass sheet is 200 µm or less, and
the affected layer has a total thickness of from 30 nm to 500 nm.

2. The glass sheet according to claim 1, wherein
the affected layer possesses a larger amount of water than an amount of water possessed by other parts of the glass sheet, and
a relationship between an average hydrogen concentration Hs of the affected layer and an average hydrogen concentration Hb of an inside region present in a lower part from the affected layer satisfies 1<Hs/Hb<50.

3. The glass sheet according to claim 1, wherein in the first main surface, a value obtained by dividing an arithmetic mean height Sa by the average element length RSm is from 0.001 to 0.01.

4. The glass sheet according to claim 1, wherein in the first main surface, the skewness Ssk is from −3.0 to −0.2.

5. The glass sheet according to claim 1, wherein in the first main surface, a maximum peak height Sp is from 20 nm to 250 nm.

6. The glass sheet according to claim 1, wherein in the first main surface, a value obtained by dividing an arithmetic mean height Sa by the average element length RSm is from 0.001 to 0.01.

7. The glass sheet according to claim 1, wherein in the first main surface, the skewness Ssk is from −3.0 to −0.2.

8. The glass sheet according to claim 1, wherein in the first main surface, a maximum peak height Sp is from 20 nm to 250 nm.

9. An antireflection layer-attached glass sheet comprising:
the glass sheet according to claim 1; and
an antireflection layer formed on the first main surface of the glass sheet,
wherein the antireflection layer-attached glass sheet has a haze of 2.0% or less when light is incident from a first main surface side.

10. A production method of the glass sheet according to claim 1, the method comprising:
applying a wet blasting treatment to a first main surface of a glass sheet comprising the first main surface and a second main surface opposing the first main surface.

11. The production method of the glass sheet according to claim 10, wherein in the wet blasting treatment, a spraying angle of a slurry containing abrasive grains relative to a surface of the glass sheet is from 25° to 80°.

12. The production method of the glass sheet according to claim 10, wherein in the wet blasting treatment, the abrasive grains are alumina, and an average grain size of the abrasive grains is 4 µm or less.

13. A glass sheet comprising a first main surface and a second main surface opposing the first main surface, wherein
the glass sheet has an affected layer directly below the first main surface,
in at least a part of the first main surface, an average element length RSm is from 2,500 nm to 6,000 nm, a root-mean-square height Sq is from 3 nm to 45 nm, and a skewness Ssk is a negative value,
an absolute value of a difference between an Al/Si value in the first main surface and an Al/Si value in the second main surface is 0.1 or less, provided that Al is a peak area of the Al2p binding energy peak measured by X-ray photoelectron spectroscopy and Si is a peak area of an Si2p binding energy peak measured by X-ray photoelectron spectroscopy, and
the affected layer has a total thickness of from 30 nm to 500 nm.

14. The glass sheet according to claim 13, wherein in the first main surface, a value obtained by dividing an arithmetic mean height Sa by the average element length RSm is from 0.001 to 0.01.

15. The glass sheet according to claim 13, wherein in the first main surface, the skewness Ssk is from −3.0 to −0.2.

16. The glass sheet according to claim 13, wherein in the first main surface, a maximum peak height Sp is from 20 nm to 250 nm.

17. The glass sheet according to claim 13, wherein
the affected layer possesses a larger amount of water than an amount of water possessed by other parts of the glass sheet, and
a relationship between an average hydrogen concentration Hs of the affected layer and an
average hydrogen concentration Hb of an inside region present in a lower part from the affected layer satisfies 1<Hs/Hb<50.

18. The glass sheet according to claim 13, wherein in the first main surface, a value obtained by dividing an arithmetic mean height Sa by the average element length RSm is from 0.001 to 0.01.

19. The glass sheet according to claim 13, wherein in the first main surface, the skewness Ssk is from −3.0 to −0.2.

20. The glass sheet according to claim 13, wherein in the first main surface, a maximum peak height Sp is from 20 nm to 250 nm.

21. An antireflection layer-attached glass sheet comprising: the glass sheet according to claim 13; and
an antireflection layer formed on the first main surface of the glass sheet,
wherein the antireflection layer-attached glass sheet has a haze of 2.0% or less when light is incident from a first main surface side.

* * * * *